United States Patent
Lin et al.

(10) Patent No.: US 11,089,335 B2
(45) Date of Patent: Aug. 10, 2021

(54) METHOD AND APPARATUS OF IN-LOOP FILTERING FOR VIRTUAL BOUNDARIES

(71) Applicant: MEDIATEK INC., Hsinchu (TW)

(72) Inventors: Sheng Yen Lin, Hsinchu (TW); Jian-Liang Lin, Hsinchu (TW); Lin Liu, Beijing (CN)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/737,377

(22) Filed: Jan. 8, 2020

(65) Prior Publication Data

US 2020/0228843 A1 Jul. 16, 2020

Related U.S. Application Data

(60) Provisional application No. 62/792,489, filed on Jan. 15, 2019, provisional application No. 62/791,963, filed on Jan. 14, 2019.

(30) Foreign Application Priority Data

Dec. 26, 2019 (WO) ................ PCT/CN2019/128631

(51) Int. Cl.
*H04N 19/70* (2014.01)
*H04N 19/176* (2014.01)
(Continued)

(52) U.S. Cl.
CPC .......... *H04N 19/70* (2014.11); *H04N 19/117* (2014.11); *H04N 19/176* (2014.11); *H04N 19/46* (2014.11)

(58) Field of Classification Search
CPC ...... H04N 19/70; H04N 19/176; H04N 19/46; H04N 19/117; H04N 19/82; H04N 19/597
See application file for complete search history.

(56) References Cited

U.S. PATENT DOCUMENTS

| 10,694,184 B2 | 6/2020 | Ahn et al. |
| 2010/0238160 A1 | 9/2010 | Yea et al. |

(Continued)

FOREIGN PATENT DOCUMENTS

| CN | 103503456 A | 1/2014 |
| CN | 104702963 A | 6/2015 |

(Continued)

OTHER PUBLICATIONS

International Search Report dated Nov. 27, 2019, issued in application No. PCT/CN2019/103705.

(Continued)

*Primary Examiner* — Joseph W Becker
(74) *Attorney, Agent, or Firm* — McClure, Qualey & Rodack, LLP

(57) ABSTRACT

Method and apparatus of coding a video sequence are disclosed. According to this method, a first syntax is signalled in or parsed from a bitstream, where the first syntax indicates whether a loop filtering process is disabled for one or more virtual boundaries in a corresponding region. A reconstructed filter unit in a current picture is received, wherein the reconstructed filter unit is associated with the loop filter and the reconstructed filter unit comprises reconstructed pixels for applying a loop filtering process associated with the loop filter to a current reconstructed pixel. When the first syntax is true, the loop filter processing is disabled when the reconstructed filter unit is across said one or more virtual boundaries in the corresponding region. When the first syntax is false, the loop filter processing is not disabled when the reconstructed filter unit is across the virtual boundary.

18 Claims, 8 Drawing Sheets

Current pixel  Unexpected pixel  True neighbouring pixel

(51) Int. Cl.
*H04N 19/46* (2014.01)
*H04N 19/117* (2014.01)

(56) References Cited

U.S. PATENT DOCUMENTS

| | | |
|---|---|---|
| 2013/0044809 A1 | 2/2013 | Chong et al. |
| 2013/0272624 A1 | 10/2013 | Budagavi |
| 2013/0322523 A1 | 12/2013 | Huang et al. |
| 2013/0343447 A1 | 12/2013 | Chen et al. |
| 2017/0214937 A1 | 7/2017 | Lin et al. |
| 2017/0272758 A1 | 9/2017 | Lin et al. |
| 2017/0332107 A1 | 11/2017 | Abbas et al. |
| 2019/0007684 A1 | 1/2019 | Van der Auwera et al. |
| 2019/0215532 A1 | 7/2019 | He et al. |
| 2019/0253734 A1 | 8/2019 | Lee et al. |
| 2020/0120359 A1* | 4/2020 | Hanhart ............... H04N 19/105 |
| 2020/0304787 A1 | 9/2020 | Budagavi |
| 2020/0396461 A1 | 12/2020 | Zhao et al. |

FOREIGN PATENT DOCUMENTS

| | | |
|---|---|---|
| CN | 105141948 A | 12/2015 |
| CN | 107040778 A | 8/2017 |
| CN | 107155109 A | 9/2017 |
| CN | 104702963 B | 11/2017 |
| CN | 108632619 A | 10/2018 |
| CN | 109155857 A | 1/2019 |
| WO | 2017/133660 A1 | 8/2017 |
| WO | 2018/036447 A1 | 3/2018 |
| WO | 2018/182377 A1 | 10/2018 |

OTHER PUBLICATIONS

International Search Report dated Nov. 27, 2019, issued in application No. PCT/CN2019/103706.
Bross, B., et al.; "Versatile Video Coding (Draft 3);" Joint Video Experts Team (JVET) of ITU-T SG 16 WP 3 and ISO/IEC JTC 1/SC 29/WG 11; Oct. 2018; pp. 1-233.
Chinese language office action dated Aug. 27, 2020, issued in application No. TW 108131376.
Chinese language office action dated Feb. 9, 2021, issued in application No. TW 108148059.
Non-Final Office Action dated Feb. 22, 2021, issued in U.S. Appl. No. 16/557,643.
European Search Report dated Jun. 1, 2021, issued in application EP 19854497.5.
Chen, C.Y., et al.; "CE8.c.3: Multi-source SAO and ALF virtual boundary processing; Joint Collaborative Team on Video Coding (JCT-VC) of ITU-T sG16 WP3 and ISO/IEC JTC1/SC29/WG11; Nov. 21, 2011; pp. 1-11.
Lin, S.Y., et al.; "CE-13 related: Loop filter disabled across virtual boundaries;" Joint Video Experts Team (JVET) of ITU-T SG 16 WP 3 and ISO/IEC JTC 1/SC 29/WH 11; Jan. 16, 2019; pp. 1-17.

* cited by examiner

METHOD AND APPARATUS OF IN-LOOP FILTERING FOR VIRTUAL BOUNDARIES

CROSS REFERENCE TO RELATED APPLICATIONS

The present invention claims priority to U.S. Provisional patent application, Ser. No. 62/791,963, filed on Jan. 14, 2019 and U.S. Provisional Patent application, Ser. No. 62/792,489, filed on Jan. 15, 2019, and PCT Serial No. PCT/CN2019/128631, filed on Dec. 26, 2019. The U.S. Provisional Patent Applications are hereby incorporated by reference in their entireties.

FIELD OF THE INVENTION

The present invention relates to picture processing for pictures containing one or more virtual boundaries such as 360-degree virtual reality (VR360) pictures. In particular, the present invention relates to syntax design for in-loop filtering process at discontinued edges or virtual boundaries for pictures containing one or more virtual boundaries such as VR360 video.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

The 360-degree virtual reality (VR) pictures may be captured using a 360-degree spherical panoramic camera or multiple pictures arranged to cover all field of views around 360 degrees. The three-dimensional (3D) spherical picture is difficult to process or store using the conventional picture/video processing devices. Therefore, the 360-degree VR pictures are often converted to a two-dimensional (2D) format using a 3D-to-2D projection method, such as EquiRectangular Projection (ERP) and CubeMap Projection (CMP). Besides the ERP and CMP projection formats, there are various other VR projection formats, such as OctaHedron Projection (OHP), icosahedron projection (ISP), Segmented Sphere Projection (SSP) and Rotated Sphere Projection (RSP) that are widely used in the field.

The VR360 video sequence usually requires more storage space than the conventional 2D video sequence. Therefore, video compression is often applied to VR360 video sequence to reduce the storage space for storage or the bit rate for streaming/transmission.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). VR360 video sequences can be coded using HEVC. However, the present invention may also be applicable for other coding methods.

In HEVC, one slice is partitioned into multiple coding tree units (CTU). For colour pictures, a colour slice may be partitioned into multiple coding tree blocks (CTB). The CTU is further partitioned into multiple coding units (CUs) to adapt to various local characteristics. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

While the coding process can effectively reduce required bandwidth for transmission or required capacity for storage, the coding process often introduces coding noise referred as coding artefacts. In order to alleviate the coding artefact, various filtering techniques, such as de-blocking filter, SAO (sample adaptive offset) and ALF (adaptive loop filter), have been introduced. The filtering process is often applied to reconstructed pictures that are later used as reference pictures. In other words, the filtering process is inside the coding loop. Accordingly, such filtering process is also referred as in-loop filtering.

In HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filtering process for the vertical boundary (110) and horizontal boundary (120) as shown in FIG. 1A and FIG. 1B respectively. For a vertical boundary (i.e., line 110 in FIG. 1A), a horizontal filter is applied to some boundary samples in each horizontal line. For example, the horizontal de-blocking filter may be applied to p00, p01 and p02 on the left side of the vertical boundary and q00, q01 and q02 on the right side of the vertical boundary. Similarly, for a horizontal boundary (i.e., line 120 in FIG. 1B), a vertical filter is applied to some boundary samples in each vertical line. For example, the vertical de-blocking filter may be applied to p00, p01 and p02 on the top side of the horizontal boundary and q00, q01 and q02 on the bottom side of the horizontal boundary. In other words, the de-blocking filter is applied in a direction perpendicular to the boundary.

A boundary strength value, Bs is calculated for each four-sample length boundary and can take 3 possible values. Luma and chroma components are processed separately in the de-blocking process. For the Luma component, only block boundaries with Bs values equal to 1 or 2 can be filtered. In the case of chroma components, only boundaries with Bs value equal to 2 can be filtered.

For luma component, additional conditions are checked for each four-sample length boundary to determine whether de-blocking filtering should be applied and to further determine whether a normal filter or a strong filter should be applied if de-blocking is applied.

For the luma component in the normal filtering mode, two samples at each side of the boundary can be modified. In the strong filtering mode, three samples at each side of the boundary can be modified.

For the chroma component, only one sample at each side of the boundary can be modified when the boundary strength is greater than 1.

SAO processing is developed to compensate intensity level offset caused by the coding process. SAO processing adopted by HEVC consists of two methods. One is Band Offset (BO), and the other is Edge Offset (EO). BO is used to classify pixels into multiple bands according to pixel intensities and an offset is applied to pixels in one or more bands. EO is used to classify pixels into categories according to relations between a current pixel and respective neighbours and an offset is applied to pixels in each category. There are 4 EO directional patterns (0°, 90°, 135°, and 45°) and no processing (OFF). The four EO types are shown in FIG. 2.

Upon classification of all pixels in a region, one offset is derived and transmitted for pixels in each category. SAO processing is applied to luma and chroma components, and each of the components is independently processed. One offset is derived for all pixels of each category except for category 4 of EO, where Category 4 is forced to use zero offset. Table 1 below lists the EO pixel classification, where "C" denotes the pixel to be classified. As shown in Table 1, the conditions associated with determining a category are related to comparing the current pixel value with two respective neighbour values according to the EO type. The category can be determined according to the comparison results (i.e., ">", "<" or "="). Each category has a special meaning in relative intensity between the current pixel and neighbouring pixels. For example, category 0 corresponds to a "valley", where the intensity of the centre pixel is lower than two neighbouring pixels. Category 3 corresponds to a "peak", where the intensity of the centre pixel is higher than two neighbouring pixels. Categories 1 and 2 correspond to a flat segment with an upward slope (Category 2) or a downward slope (Category 1).

TABLE 1

| Category | Condition |
| --- | --- |
| 0 | C < two neighbours |
| 1 | C < one neighbour && C == one neighbour |
| 2 | C > one neighbour && C == one neighbour |
| 3 | C > two neighbours |
| 4 | None of the above |

Adaptive Loop Filter (ALF) is a filter with adaptive filter size applied to the reconstructed pixels. ALF was evaluated during the HEVC standard development, but not adopted for HEVC. However, ALF is being considered by the emerging video coding standard, named VVC (Versatile Video Coding). To optimize the performance, ALF uses Wiener filtering techniques to derive filter coefficients. Furthermore, multiple filters are allowed for different picture regions. For example, the ALF can be a 5×5 filter or a 7×7 filter as shown in FIG. 3, where "C" indicates a current reconstructed pixel being filtered.

According to a conventional approach, the loop filters such as de-blocking, SAO and ALF will be applied to a reconstructed VR360 picture without considering the possible discontinued edges within the VR360 picture. For example, the cubemap based projection uses six faces on a cube to represent one frame in the VR360 video. The six faces corresponds to faces lifted off from the cube and fitted into different layouts, such as 1×6, 6×1, 2×3 or 3×2 layout. Among various cubemap layouts, the 3×2 layout is often used due to its coding efficiency. FIG. 4 illustrates an example of 3×2 cubemap layout formation. The layout 410 corresponds to six faces lifted off from a cube, where image 412 corresponds to a front face, the three images 414 connected to the left of image 412 correspond to the other three faces connected to the front face 412 in the horizontal direction, image 416 corresponds to the face on the top of the cube and image 418 corresponds to the face on the bottom of the cube. Accordingly, the fours images including images 414 and image 412 are continuous in the horizontal direction and the three images includes image 416, image 412 and image 418 are continuous in the vertical direction. The 4×3 layout 410 contains some blank areas, which is not efficient for coding. The layout 420 corresponds to a 3×2 cubemap layout, where the three images 414 and the three vertically connected images (images 416, 412 and 418) are abutted. The top sub-frame corresponding to the three images 414 are continuous in the horizontal direction. Also, the bottom sub-frame corresponding to the three images 412, 416 and 418 are continuous in the horizontal direction. However, the edges 422 between the top sub-frame and the bottom sub-frame is discontinuous. In other words, a VR360 picture corresponding to a layout format from a 3D projection may contain discontinuous edge within the picture.

Besides the VR360 pictures, other picture formats may also contain discontinuous edges within the picture. For example, the Picture-In-Picture (PIP) format is a popular format to display two videos (e.g. a main video and a sub-video) on the same screen simultaneously. Therefore, for each PIP frame, discontinuity may exist between the pictures associated with the two videos. The issues of loop filtering process across the discontinuous edge exist in the VR360 pictures as well as the PIP frames.

FIG. 5A to FIG. 5C illustrate examples of in-loop filters applied to a reconstructed VR360 picture. FIG. 5A illustrates an example of de-blocking filter, where the de-blocking filter is applied to a current block 510. The de-blocking filter is applied to the horizontal boundary 516 between the current block 510 and the neighbouring block 512 above. The de-blocking filter is also applied to the vertical boundary 518 between the current block 510 and the neighbouring block 514 on the left.

FIG. 5B illustrates an example of SAO processing. The offset compensation parameters are derived based on the statistics of each coding tree unit (CTU) 520. During the statistic derivation, the BO and EO classification is applied to all pixels. For each BO and EO category, an offset value is determined. After the statistics for the CTU are collected, the SAO can be applied to reconstructed pixels in the CTU.

FIG. 5C illustrates an example of ALF process for a reconstructed VR360 picture. A reconstructed pixel 530 may be filtered by a 5×5 filter or a reconstructed pixel 532 may be filtered by a 7×7 filter. As mentioned before, the filter parameters may be designed using Wiener filter technique to minimize the error between the original picture and the reconstructed picture. For each reconstructed pixel, the filter size is adaptively selected to achieve the best performance.

As illustrated in layout 420 in FIG. 4, the 3×2 layout for cubemap contains a discontinuous edge between the top sub-frame and the bottom sub-frame. The pixels on one side of the boundary 422 may be quite different from the pixels on the other side of the boundary 422. Therefore, when an in-loop filter is applied to reconstructed pixels next to the boundary or close to the boundary, it may cause undesirable result. FIG. 6 illustrates an example of SAO filter applied to a reconstructed pixel 622, where the discontinuous edge 610 is indicated. SAO operation 620 at the discontinuous edge is illustrated for the reconstructed pixel 622. The 3×3 SAO window is indicated by the dash-lined box 624. For the horizontal boundary 610, the SAO filtering process for 90°, 135°, and 45° will utilise a reference pixel from the other side of the discontinuous boundary. The neighbouring pixels 626 on the other side of discontinuous edge (named unexpected pixels) may be very different from the reconstructed pixel 622 being filtered though they are close to the reconstructed pixel 622. In this case, the SAO processing for the boundary pixels may produce undesirable results.

Therefore, it is desirable to develop techniques to overcome the issues related to in-loop filter for VR360 pictures.

BRIEF SUMMARY OF THE INVENTION

Method and apparatus of coding a video sequence are disclosed, wherein the reconstructed filter unit comprises a plurality of reconstructed pixels for loop filtering process. According to this method, a first syntax is signalled in a bitstream at an encoder side or the first syntax is parsed from the bitstream at a decoder side. A reconstructed filter unit in a current picture is received, wherein the reconstructed filter unit is associated with a loop filter and the reconstructed filter unit comprises reconstructed pixels for applying a loop filtering process associated with the loop filter to a current reconstructed pixel. The first syntax indicates whether the loop filtering process is disabled for one or more virtual boundaries in a corresponding region. When the first syntax is true, the loop filter processing is disabled when the reconstructed filter unit is across said one or more virtual boundaries in the corresponding region. When the first syntax is false, the loop filter processing is not disabled when the reconstructed filter unit is across the virtual boundary.

The first syntax can be signalled in or parsed from the bitstream at a syntax level comprising SPS (Sequence Parameter Set), PPS (Picture Parameter Set), APS (Application Parameter Set), slice, tile, picture, CTU (Coding Tree Unit), CU (Coding Unit), PU (Prediction Unit) or TU (Transform Unit) level for the corresponding region.

In one embodiment, if the first syntax is true, one or more second syntaxes are signalled at the encoder side or parsed at the decoder side to indicate virtual boundary information in the corresponding region. The second syntaxes comprise a first number to indicate a number of vertical virtual boundaries and a second number to indicate a number of horizontal virtual boundaries in the corresponding region. In one example, each vertical virtual boundary is from a top edge to a bottom edge of the corresponding region and each horizontal virtual boundary is from a left edge to a right edge of the corresponding region. In this case, when the first number is greater than 0, locations of each vertical virtual boundary are transmitted in or parsed from the bitstream. When the second number is greater than 0, locations of each horizontal virtual boundary are transmitted in or parsed from the bitstream.

In another example, the vertical virtual boundaries are not necessarily from a top edge to a bottom edge of the corresponding region and the horizontal virtual boundaries are not necessarily from a left edge to a right edge of the corresponding region. In this case when the first number is greater than 0, locations of x-position, y starting position and y ending position for each vertical virtual boundary are transmitted in or parsed from the bitstream; and when the second number is greater than 0, locations of y-position, x starting position and x ending position for each horizontal virtual boundary are transmitted in or parsed from the bitstream.

In yet another example, length of the vertical virtual boundaries and the length of the horizontal virtual boundaries is fixed. In this case, when the first number is greater than 0, location of starting point for each vertical virtual boundary is transmitted in or parsed from the bitstream. When the second number is greater than 0, the location of starting point for each horizontal virtual boundary is transmitted in or parsed from the bitstream.

In one embodiment, if the first syntax is true, one or more second syntaxes are signalled at the encoder side or parsed at the decoder side, where said one or more second syntaxes indicate a number of said one or more virtual boundaries in the corresponding region. When the number of said one or more virtual boundaries is greater than 0, locations of starting points and ending points of said one or more virtual boundaries are transmitted in or parsed from the bitstream. Said one or more virtual boundaries may correspond to one or more rectangle boxes and starting points and ending points correspond to left-top positions and right-bottom positions of said one or more rectangle boxes.

In one embodiment, if the first syntax is true, a second syntax is signalled at the encoder side or parsed at the decoder side, and wherein said the second syntax indicates a shape of at least one virtual boundary in the corresponding region. For example, the shape of at least one virtual boundary in the corresponding region comprises a straight-line virtual boundary and a circular virtual boundary. When the second syntax indicates a circular virtual boundary, one or more third syntaxes are signalled at the encoder side or parsed at the decoder side to indicate location of centre and radius of at least one circle.

In one embodiment, one or more second syntaxes are signalled at the encoder side or parsed at the decoder side to indicate difference values between a current virtual boundary and a previous virtual boundary. For example, when the current virtual boundary is a first virtual boundary in the corresponding region, absolute position of the first virtual boundary is signalled directly at the encoder side or parsed directly at the decoder side. In another example, when the current virtual boundary is a first virtual boundary in the corresponding region, difference between the first virtual boundary and a starting point of the corresponding region is signalled directly at the encoder side or parsed at the decoder side.

In one embodiment, if the first syntax is true, one or more second syntaxes are signalled at the encoder side or parsed at the decoder side to indicate locations of said one or more virtual boundaries, and the locations of said one or more virtual boundaries are measured in terms of width and/or height of processing unit. For example, the processing unit is set to a region comprising a picture, a slice, a tile, a CTU (coding tree unit), a CU (coding unit), a PU (prediction unit), a TU (transform unit), a pre-defined value, or a combination thereof.

In one embodiment, if a target corresponding region have same virtual boundaries as a previous corresponding region, the target corresponding region inherits the same virtual boundaries as the previous corresponding region. For example, the target corresponding region comprises a picture, a slice, a tile, a CTU (coding tree unit), a CU (coding unit), a PU (prediction unit), a TU (transform unit). Furthermore, a second syntax can be signalled at the encoder side or parsed at the decoder side to indicate whether the target corresponding region inherits the same virtual boundaries as the previous corresponding region.

In one embodiment, the video sequence corresponds to a 360-degree virtual reality (VR360) video. The VR360 video comprises Equirectangular projection (ERP), Padded Equirectangular projection (PERP), Octahedron Projection, Icosahedron Projection, Truncated Square Pyramid (TSP), Segmented Sphere Projection (SSP) or Rotated Sphere Projection (RSP).

In one embodiment, the loop filter belongs to a group comprising de-blocking filter, SAO (Sample Adaptive Offset) filter and ALF (Adaptive Loop Filter).

BRIEF DESCRIPTION OF THE DRAWINGS

FIG. 8B illustrates an example of different CTUs (Coding Tree Units) that have different virtual boundaries as indicated by dash lines.

FIG. 8C illustrates an example of the starting point or end point of a virtual boundary is located inside a picture.

DETAILED DESCRIPTION OF THE INVENTION

Figure 1A:
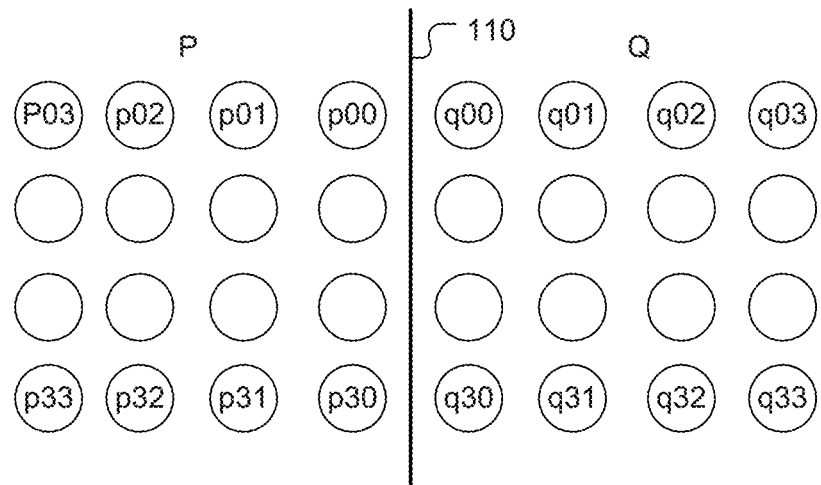
FIG. 1A illustrates an example of the boundary pixels involved in de-blocking filtering process for the vertical boundary.
Figure 1B:
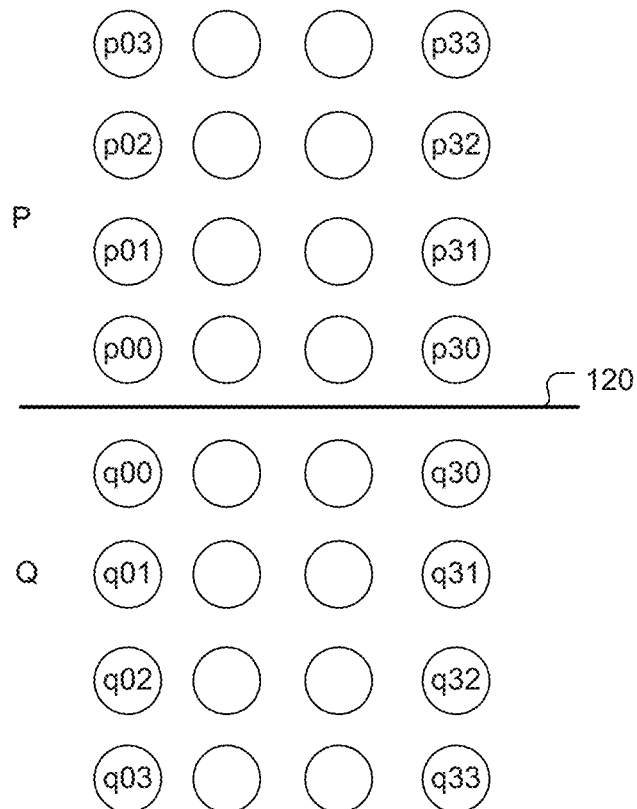
FIG. 1B illustrates an example of the boundary pixels involved in de-blocking filtering process for the horizontal boundary.
Figure 2:
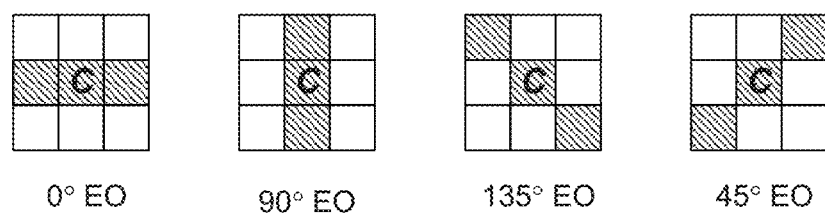
FIG. 2 shows the 4 EO (Edge Offset) directional patterns (0°, 90°, 135°, and 45°) for SAO (Sample Adaptive Offset).
Figure 3:
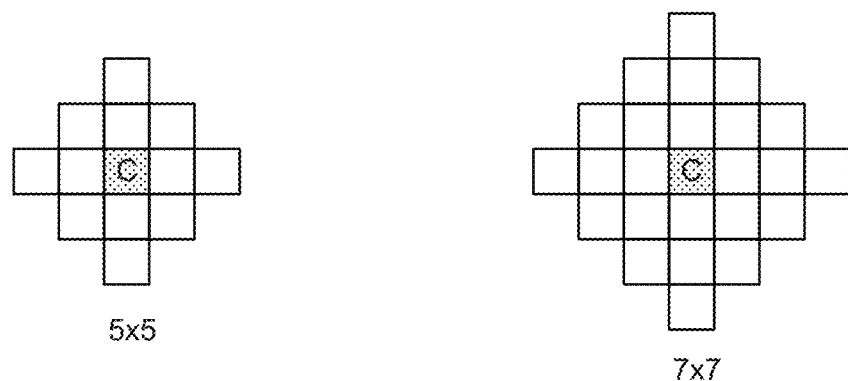
FIG. 3 illustrates an example of the ALF comprising a 5×5 filter and a 7×7 filter, where "C" indicates a current reconstructed pixel being filtered.
Figure 4:
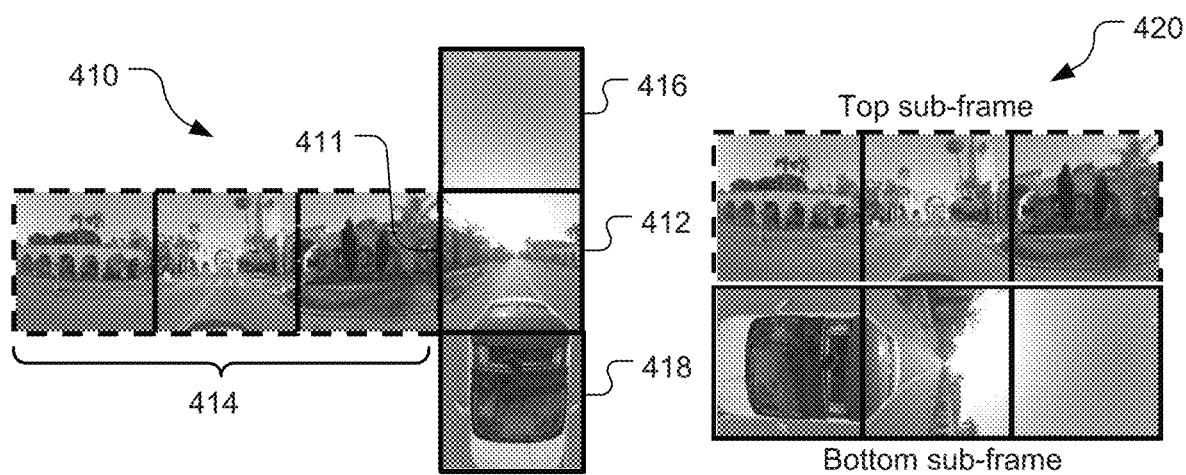
FIG. 4 illustrates an example of 4×3 and 3×2 cubemap layout formations.
Figure 5A:
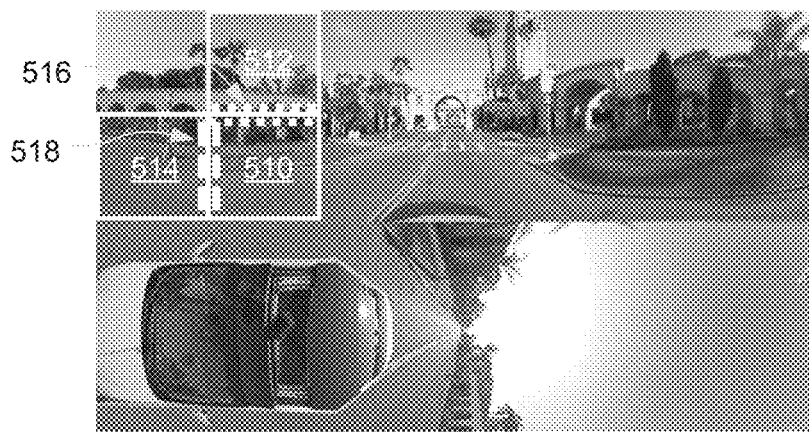
FIG. 5A illustrates an example of de-blocking filter applied to a block of a VR360 picture in the 3×2 layout.
Figure 5B:
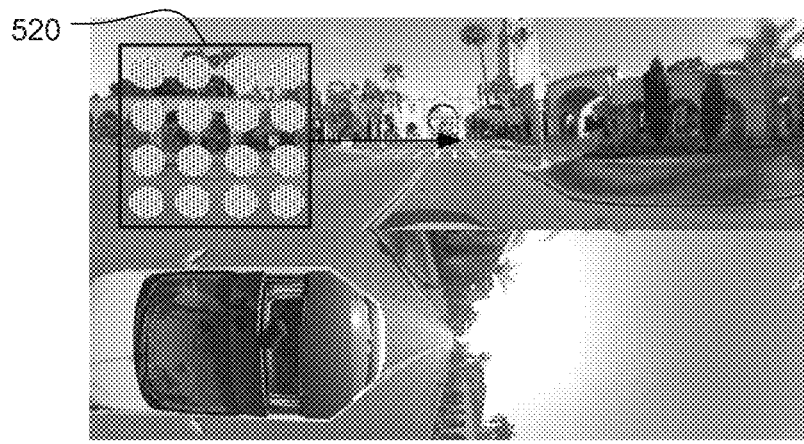
FIG. 5B illustrates an example of SAO processing applied to pixels of a VR360 picture in the 3×2 layout.
Figure 5C:
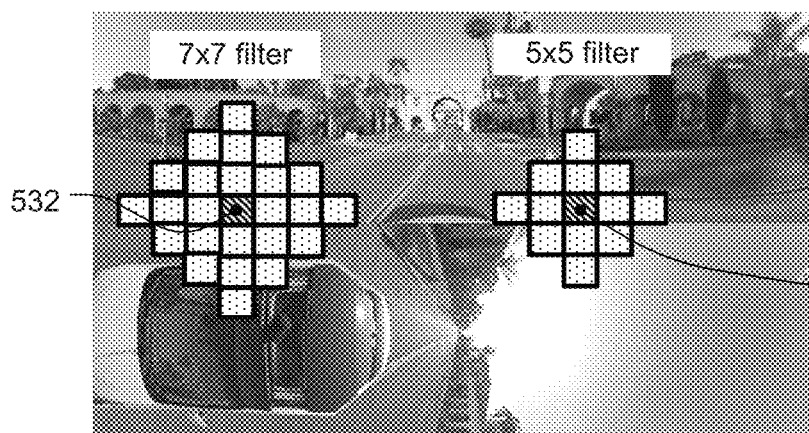
FIG. 5C illustrates an example of ALF process using a 5×5 or 7×7 filter for a reconstructed VR360 picture.
Figure 6:
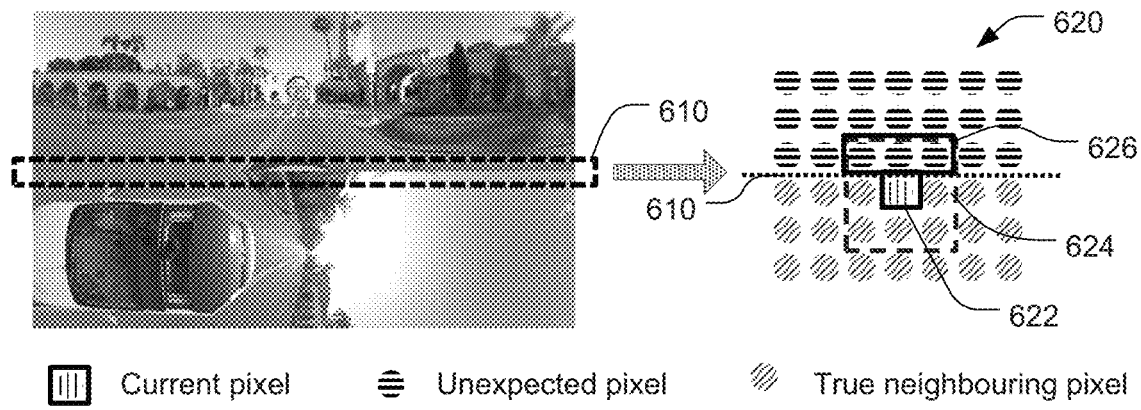
FIG. 6 illustrates an example of SAO filter applied to a reconstructed pixel at the discontinuous edge.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

As mentioned before, when an in-loop filter is applied to a discontinuous boundary in VR360 videos, the filtering process for a reconstructed pixel on one side of the discontinuous boundary may need to use one or more reconstructed pixels on the other side of the discontinuous boundary (referred as unexpected pixels). Due to the discontinuity between the pixels on two sides of the discontinuous boundary, use of the unexpected pixels for the in-loop filtering processing may cause noticeable artefacts. Therefore, according to a method of the present invention, the in-loop filtering process is disabled or a smaller size filter is used if the in-loop filtering process is across the discontinuous boundary. The discontinuous boundary or edge in VR360 video or PIP is also referred as virtual boundary in this disclosure. The in-loop filter may be referred as loop filter in this disclosure. The in-loop filtering process may be referred as loop filtering process in this disclosure.

Figure 7A:
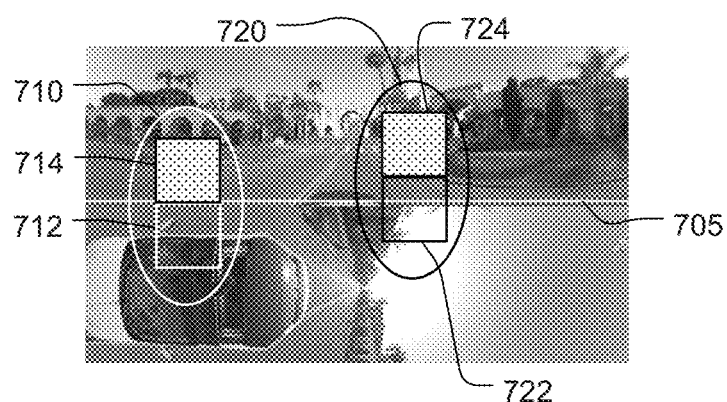
FIG. 7A illustrates examples of de-blocking filtering process being applied across the discontinuous boundary or applied to a block boundary close to the discontinuous boundary.

FIG. 7A illustrates de-blocking filtering process being applied across the discontinuous boundary 705. In FIG. 7A, the de-blocking filtering process 710 is applied to a current block 712, where the block boundary is aligned with the discontinuous boundary 705. The de-blocking filtering process for the current block 712 involves unexpected pixels as indicated by the dots-filled area 714. Since the de-blocking filtering process is applied across the discontinuous boundary, the method according to the present invention disables the de-blocking filtering process for the current block. The de-blocking filtering process 720 is applied to a current block 722, where the discontinuous boundary 705 is located inside the current block. The de-blocking filtering process for the current block 722 may involve unexpected pixels, where some of pixels in the current block may be on a different side of the virtual boundary from the neighbouring reference block as indicated by the dots-filled area 724. A method according to the present invention disables the de-blocking filtering process for the current block or uses a de-blocking filter with a smaller filter size. In addition, when the virtual boundary is located inside a neighbouring reference block, a method according to the present invention disables the de-blocking filtering process for the current block or uses a de-blocking filter with a smaller filter size. In the HEVC, the de-blocking filter may use up to 4 pixels on each side of the block boundary. According to embodiments of the present invention, the de-blocking filter may use less pixels on at least one side of the block boundary.

The de-blocking filter may be applied to a block such as the transform block boundary, sub-block boundary or other types of block. Accordingly, in one embodiment, the loop filtering process is disabled for a block (e.g. a sub-block or a transform block) if the block (e.g. a sub-block edge or a transform block edge associated with the sub-block or the transform block for the de-blocking filter) is aligned with the virtual boundary or the virtual boundary is located inside the block or neighbouring block.

Figure 7B:
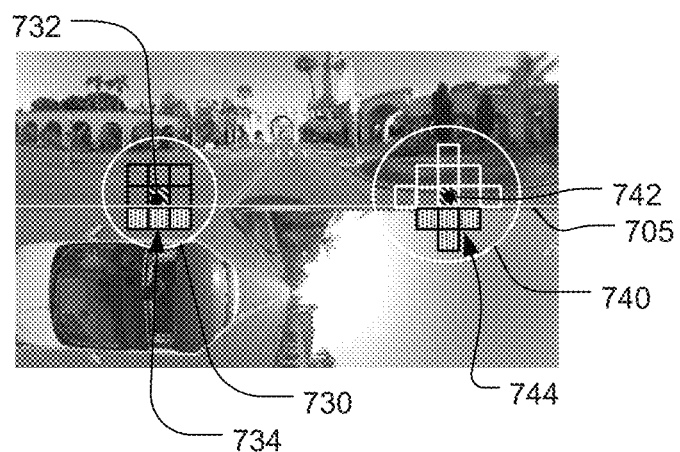
FIG. 7B illustrates examples of SAO (Sample Adaptive Offset) and ALF (Adaptive Loop Filter) filtering processes being applied across the discontinuous boundary.

In FIG. 7B, the SAO filtering process 730 is applied to a current pixel 732 adjacent to the discontinuous boundary 705. The SAO filtering process for the current pixel 732 involves unexpected pixels as indicated by the dots-filled squares 734. Since the SAO filtering process is applied across the discontinuous boundary, the method according to the present invention disables the SAO filtering process for the current pixel. In FIG. 7B, the ALF filtering process 740 is applied to a current pixel 742 adjacent to the discontinuous boundary 705. The ALF filtering process for the current pixel 742 involves unexpected pixels as indicated by the dots-filled squares 744. Since the ALF filtering process is applied across the discontinuous boundary, the method according to the present invention disables the ALF filtering process for the current pixel or use a smaller ALF if the smaller ALF is available. For example, if both 7×7 and 5×5 ALF are available, when the 7×7 ALF is across the virtual boundary, the 5×5 ALF may be used. The ALF filtering process includes determination of filter coefficients and applying the filter. While, de-blocking, SAO and ALF in-loop filters are used as examples for the method of disabling in-loop filtering process across the discontinuous boundary, the method may also be applied to other types of in-loop filtering process.

According to embodiments of the present invention, a syntax (e.g. control flag or enable flag) can be transmitted in the bitstream at a syntax level such as the SPS, PPS, APS, slice, tile, picture, CTU, CU, PU or TU level to indicate whether the filters are disabled for virtual boundaries in the corresponding region (e.g. picture, slice, tile, CTU, CU, TU or PU). For example, a control flag sps_loop_filter_disabled_across_virtual_boundaries_flag can be signalled in the sequence level to indicate whether the filters are disabled for virtual boundaries in the frames of the sequence.

Figure 8A:
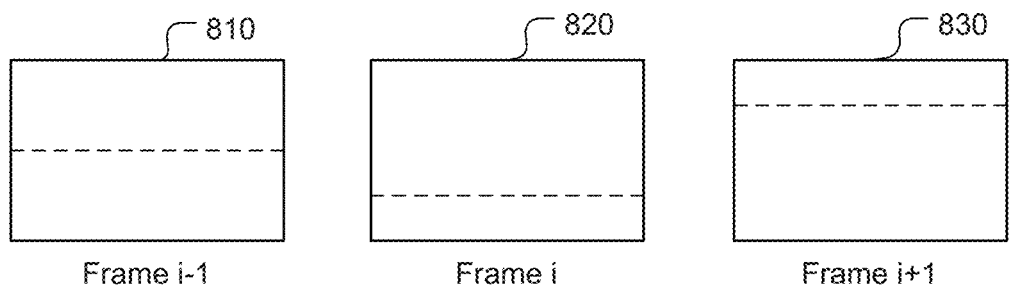
FIG. 8A illustrates an example where three frames (i−1, i and i+1) have different virtual boundaries as indicated by dash lines.

The virtual boundaries can be different in different pictures, slices, tiles, CTUs, CUs, PUs or TUs. For example, three frames (i−1, i and i+1) are shown in FIG. 8A, where the three frames have different virtual boundaries as indicated by dash lines. FIG. 8B illustrates an example of different CTUs (i.e., 840, 842, 844 and 846) that have different virtual boundaries as indicated by dash lines.

In the following, various syntax structures according to embodiments of the present invention are disclosed.

Syntax Structure Design I

In one embodiment, if the syntax (e.g. control flag or enable flag) is true, then the in-loop filters are disabled across the virtual boundaries; and if the syntax (e.g. control flag or enable flag) is false, then the in-loop filters are not disabled when the reconstructed filter unit is across the virtual boundaries.

In one embodiment, if the syntax (e.g. an control flag or enable flag) is equal to True, two syntaxes can be also signalled in the bitstream to indicate the number of the vertical and horizontal virtual boundaries, respectively. If the number of vertical virtual boundaries is greater than 0, the locations of all of the vertical virtual boundaries are signalled in the bitstream. Similarly, if the number of horizontal virtual boundaries is greater than 0, the locations of all of the horizontal virtual boundaries are signalled in the bitstream.

An exemplary SPS syntax table incorporating an embodiment of the present invention is shown in Table 2.

TABLE 2

|  | Descriptor |
| --- | --- |
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_ver_virtual_boundaries | ue(v) |
|         if( sps_num_ver_virtual_boundaries != 0 ) { | |
|             for( i = 0; i < sps_num_ver_virtual_boundaries; i++ ) { | |
|                 sps_virtual_boundaries_pos_x[ i ] | ue(v) |
|             } | |
|         } | |
|         sps_num_hor_virtual_boundaries | ue(v) |
|         if( sps_num_hor_virtual_boundaries != 0 ) { | |
|             for( i = 0; i < sps_num_hor_virtual_boundaries; i++ ) { | |
|                 sps_virtual_boundaries_pos_y[ i ] | ue(v) |
|             } | |
|         } | |
|     } | |
|     ... | |
| } | |

Since the virtual boundaries are not always set from the leftmost position to the rightmost position of a region (e.g. picture, slice, tile, CTU, CU, PU, or TU) or from the topmost positions to the bottommost positions of a region, the starting point or end point of a virtual boundary can be located inside a picture. For example, the starting point or end point of a virtual boundary is located inside a picture as shown in FIG. 8C, where the vertical virtual boundary 852 has a top end inside the picture (i.e., in the middle of the picture) while the horizontal virtual boundary is from the left side to the right side of the picture. Therefore, the virtual boundary starting and ending positions are also specified in the syntax Table 3.

In another embodiment, if the syntax (i.e., control flag or enable flag) is equal to True, two syntaxes can be also signalled in the bitstream to indicate the number of the vertical and horizontal virtual boundaries, respectively. If the number of vertical virtual boundaries is greater than 0, the x position and y starting point and y ending point for each vertical virtual boundary are signalled in the bitstream. If the number of horizontal virtual boundaries is greater than 0, the y position and x starting point and x ending point for each horizontal virtual boundary are signalled in the bitstream.

An exemplary SPS syntax table incorporating the above embodiment of the present invention is shown in Table 3.

TABLE 3

|  | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_ver_virtual_boundaries | ue(v) |
|         if( sps_num_ver_virtual_boundaries != 0 ) { | |
|             for( i = 0; i < sps_num_ver_virtual_boundaries; i++ ) { | |
|                 sps_virtual_boundaries_pos_x[ i ] | ue(v) |
|                 sps_virtual_boundaries_start_pos_y[ i ] | ue(v) |
|                 sps_virtual_boundaries_end_pos_y[ i ] | ue(v) |
|             } | |
|         } | |
|         sps_num_hor_virtual_boundaries | ue(v) |
|         if( sps_num_hor_virtual_boundaries != 0 ) { | |
|             for( i = 0; i < sps_num_hor_virtual_boundaries; i++ ) { | |
|                 sps_virtual_boundaries_pos_y[ i ] | ue(v) |
|                 sps_virtual_boundaries_start_pos_x[ i ] | ue(v) |
|                 sps_virtual_boundaries_end_pos_x[ i ] | ue(v) |
|             } | |
|         } | |
|     } | |
|     ... | |
| } | |

In another embodiment, the length of the virtual boundaries is fixed. In this case, the above syntax table can be changed as shown in Table 4. Again, a syntax (e.g. control flag or enable flag) can be transmitted in the bitstream at the SPS, PPS, APS, slice, tile, picture, CTU, CU, PU or TU level to indicate whether the in-loop filters are disabled for virtual boundaries. If the syntax is true, then the in-loop filters are disabled when the reconstructed filter unit is across the virtual boundaries. If the syntax is false, then the in-loop filters are not disabled when the reconstructed filter unit is across the virtual boundaries.

If the syntax (e.g. control flag or enable flag) is equal to true, the following syntax can be also transmitted in the bitstream. Two syntaxes can be transmitted into bitstream to indicate the number of the vertical and horizontal virtual boundaries are set, respectively. If the number of vertical virtual boundaries is greater than 0, the starting points (x positions and y positions) for each vertical virtual boundary are transmitted into bitstream. If the number of horizontal virtual boundaries is greater than 0, the starting points (x positions and y positions) for each horizontal virtual boundary are transmitted into bitstream.

TABLE 4

|  | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_ver_virtual_boundaries | ue(v) |

TABLE 4-continued

| | Descriptor |
|---|---|
|     if( sps_num_ver_virtual_boundaries != 0 ) { | |
|         for( i = 0; i < sps_num_ver_virtual_boundaries; i++ ) { | |
|             sps_ver_virtual_boundaries_pos_x[ i ] | ue(v) |
|             sps_ver_virtual_boundaries_pos_y[ i ] | ue(v) |
|         } | |
|     } | |
|     sps_num_hor_virtual_boundaries | ue(v) |
|     if( sps_num_hor_virtual_boundaries != 0 ) { | |
|         for( i = 0; i < sps_num_hor_virtual_boundaries; i++ ) { | |
|             sps_hor_virtual_boundaries_pos_x[ i ] | ue(v) |
|             sps_hor_virtual_boundaries_pos_y[ i ] | ue(v) |
|         } | |
|     } | |
|   } | |
|     ... | |
| } | |

Syntax Structure Design II

A more flexible syntax structure to signal various types of virtual boundaries is also disclosed. The virtual boundaries are not always set from the leftmost positions to the rightmost positions of a region (picture, slice, tile, CTU, CU, PU, TU) or from the topmost positions to the bottommost positions of a region.

Two location starting point and ending point for each virtual boundary are signalled in the bitstream so that the virtual boundaries can be set as rectangle boxes or straight lines. The stating point indicates the left-top position of the box and the ending point indicates the right-bottom position of the box.

If the syntax (i.e., control flag or enable flag) is equal to True, the following syntax can be also signalled in the bitstream. One syntax can be signalled in the bitstream to indicate the number of the virtual boundaries. If the number of virtual boundaries is greater than 0, the locations of the starting points and the end points of all of the virtual boundaries are signalled in the bitstream.

An exemplary syntax table incorporating the above embodiment is shown in Table 5.

TABLE 5

| | Descriptor |
|---|---|
| seq_parameter_set_rbsp( ) { | |
|     ... | |
|     sps_loop_filter_disabled_across_virtual_boundaries_flag | u(1) |
|     if( sps_loop_filter_disabled_across_virtual_boundaries_flag ) { | |
|         sps_num_virtual_boundaries | ue(v) |
|         if( sps_num_virtual_boundaries != 0 ) { | |
|             for( i = 0; i < sps_num_virtual_boundaries; i++ ) { | |
|                 sps_virtual_boundaries_start_pos_x[ i ] | ue(v) |
|                 sps_virtual_boundaries_start_pos_y[ i ] | ue(v) |
|                 sps_virtual_boundaries_end_pos_x[ i ] | ue(v) |
|                 sps_virtual_boundaries_end_pos_y[ i ] | ue(v) |
|             } | |
|         } | |
|     } | |
|     ... | |
| } | |

In another example, the syntax structure is similar to that in Table 5. However, the virtual boundaries can be signalled by locations of their corresponding starting points and the offset values between starting points and ending points:

virtual_boundaries_end_pos_x[$i$]=virtual_boundaries_start_pos_x[$i$]+virtual_boundaries_offset_x[$i$], virtual_boundaries_end_pos_y[$i$]=virtual_boundaries_start_pos_y[$i$]+virtual_boundaries_offset_y[$i$], where i=0, . . . num_virtual_boundaries−1.

Again, a syntax (e.g. control flag or enable flag) can be transmitted in bitstream at the SPS, PPS, APS, slice, tile, picture, CTU, CU, PU or TU level to indicate whether the in-loop filters are disabled for virtual boundaries. If the syntax is true, then the in-loop filters are disabled when the reconstructed filter unit is across the virtual boundaries. If the syntax is false, then the in-loop filters are not disabled when the reconstructed filter unit is across the virtual boundaries.

If the syntax (e.g. control flag or enable flag) is equal to true, the following syntax can be also signalled in bitstream. One syntax can be signalled in the bitstream to indicate the number of the virtual boundaries existing in the corresponding region. If the number of virtual boundaries is greater than 0, the locations of the starting points and the offset values of all of the virtual boundaries are signalled in the bitstream.

An exemplary syntax table incorporating the above embodiment is shown in Table 6.

TABLE 6

| | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_virtual_boundaries | ue(v) |
|         if( sps_num_virtual_boundaries != 0 ) { | |
|             for( i = 0; i < sps_num_virtual_boundaries; i++ ) { | |
|                 sps_virtual_boundaries_start_pos_x[ i ] | ue(v) |
|                 sps_virtual_boundaries_start_pos_y[ i ] | ue(v) |
|                 sps_virtual_boundaries_offset_x[ i ] | se(v) |
|                 sps_virtual_boundaries_offset_y[ i ] | se(v) |
|             } | |
|         } | |
|     } | |
| ... | |
| } | |

Syntax Structure Design III

For some VR projection pictures, the layout may include virtual boundaries in various angles beside the vertical and horizontal directions and multiple virtual boundaries can form a non-square shape, such as a triangle or a rectangle. Furthermore, the virtual boundary can be a straight line or a shape such as a circle. According to some embodiments of the present invention, the syntax structure is designed to support such cases.

Again, a syntax (e.g. control flag or enable flag) can be transmitted in bitstream at the SPS, PPS, APS, slice, tile, picture, CTU, CU, PU or TU level to indicate whether the in-loop filters are disabled for virtual boundaries. If the syntax is true, then the in-loop filters are disabled when the reconstructed filter unit is across the virtual boundaries. If the syntax is false, then the in-loop filters are not disabled when the reconstructed filter unit is across the virtual boundaries.

In one embodiment, if the syntax (e.g. control flag or enable flag) is equal to True, the following syntax can be also signalled in the bitstream. For example, one syntax can be signalled in the bitstream to indicate the number of the virtual boundaries. If the number of virtual boundaries is greater than 0, a syntax (e.g. shape flag) can be signalled in the bitstream to indicate the shape of each virtual boundary. For example, if the shape flag is equal to a first value (e.g. 0), the virtual boundary is a straight line. The location of the starting and end points are signalled in the bitstream. If the shape flag is equal to a second value (e.g. 1), the virtual boundary is a circle. The position of the centre of the circle and the radius of the circle can be signalled in the bitstream.

An exemplary syntax table corresponding to the above embodiment based on syntax table in Table 5 for syntax structure II is shown in Table 7.

TABLE 7

| | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_virtual_boundaries | ue(v) |
|         if( sps_num_virtual_boundaries != 0 ) { | |
|             for( i = 0; i < sps_num_virtual_boundaries; i++ ) { | |
|                 sps_virtual_boundaries_shape[ i ] | u(1) |
|                 if (sps_virtual_boundaries_shape[ i ] == 0 ) {   // straight line | |
|                     sps_virtual_boundaries_start_pos_x[ i ] | ue(v) |
|                     sps_virtual_boundaries_start_pos_y[ i ] | ue(v) |
|                     sps_virtual_boundaries_end_pos_x[ i ] | ue(v) |
|                     sps_virtual_boundaries_end_pos_y[ i ] | ue(v) |
|                 } | |
|                 if (sps_virtual_boundaries_shape[ i ] == 1 ) {   // circle | |
|                     sps_virtual_boundaries_center_pos_x[ i ] | ue(v) |
|                     sps_virtual_boundaries_centerpos_y[ i ] | ue(v) |
|                     sps_virtual_boundaries_radius[ i ] | ue(v) |
|                 } | |
|             } | |
|         } | |
|     } | |
| ... | |
| } | |

An exemplary syntax table corresponding to the above embodiment based on syntax table in Table 6 for syntax structure II is shown in Table 8.

TABLE 8

|  | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_virtual_boundaries | ue(v) |
|         if( sps_num_virtual_boundaries != 0 ) { | |
|             for( i = 0; i < sps_num_virtual_boundaries; i++ ) { | |
|                 sps_virtual_boundaries_shape[ i ] | u(1) |
|                 if (sps_virtual_boundaries_shape[ i ] == 0 ) {   // straight line | |
|                     sps_virtual_boundaries_start_pos_x[ i ] | ue(v) |
|                     sps_virtual_boundaries_start_pos_y[ i ] | ue(v) |
|                     sps_virtual_boundaries_offset_x[ i ] | se(v) |
|                     sps_virtual_boundaries_offset_y[ i ] | se(v) |
|                 } | |
|                 if (sps_virtual_boundaries_shape[ i ] == 1 ) {   // circle | |
|                     sps_virtual_boundaries_center_pos_x[ i ] | ue(v) |
|                     sps_virtual_boundaries_centerpos_y[ i ] | ue(v) |
|                     sps_virtual_boundaries_radius[ i ] | ue(v) |
|                 } | |
|             } | |
|         } | |
|     } | |
|     ... | |
| } | |

Reducing the Bit Number for Signalling

In order to reduce the bit number in the bitstream, the locations of the virtual boundaries can be derived from the previous virtual boundaries and the difference values between previous and current virtual boundaries.

According to one method of the present invention, only the difference values are signalled in the bitstream. The locations of the first virtual boundary can be derived as follows:

virtual_boundaries_pos_x[0]=0+virtual_boundaries_diff_x[0], virtual_boundaries_pos_y[0]=0+virtual_boundaries_diff_y[0].

For the first virtual boundary, the location may also be derived from the starting positions of current region:

virtual_boundaries_pos_x[0]=(x position of starting point of current region)+virtual_boundaries_diff_x[0], virtual_boundaries_pos_y[0]=(y position of starting point of current region)+virtual_boundaries_diff_y[0].

The locations of other virtual boundaries can be derived as follows:

virtual_boundaries_pos_x[i]=virtual_boundaries_pos_x[i−1]+virtual_boundaries_diff_x[i], virtual_boundaries_pos_y[i]=virtual_boundaries_pos_y[i−1]+virtual_boundaries_diff_y[i].

where i=1, . . . num_virtual_boundaries−1

This method can be combined with the syntax structure I, II and III to reduce the bit number of bitstream An exemplary syntax table incorporating the above embodiment to reduce the bit number is shown in Table 9.

TABLE 9

|  | Descriptor |
|---|---|
| seq_parameter_set_rbsp( ) { | |
| ... | |
|     sps_loop_filter_disabled_across_virtual_boundaries_flag | u(1) |
|     if( sps_loop_filter_disabled_across_virtual_boundaries_flag ) { | |
|         sps_num_ver_virtual_boundaries | ue(v) |
|         if( sps_num_ver_virtual_boundaries != 0 ) { | |
|             for( i = 0; i < sps_num_ver_virtual_boundaries; i++ ) { | |
|                 sps_virtual_boundaries_diff_x[ i ]   // difference | se(v) |
|             } | |
|         } | |
|         sps_num_hor_virtual_boundaries | ue(v) |
|         if( sps_num_hor_virtual_boundaries != 0 ) { | |
|             for( i = 0; i < sps_num_hor_virtual_boundaries; i++ ) { | |
|                 sps_virtual_boundaries_diff_y[ i ]   // difference | se(v) |
|             } | |
|         } | |
|     } | |
|     ... | |
| } | |

According to another embodiment, the absolute location of the first virtual boundary and the difference values of other virtual boundaries are signalled in the bitstream. The location of the other virtual boundaries can be derived from the previous virtual boundaries and the difference values between previous and current virtual boundaries.

Except for the first virtual boundary, the locations of other virtual boundaries can be derived as before as shown below.

virtual_boundaries_pos_x[i]=virtual_boundaries_
   pos_x[i−1]+virtual_boundaries_diff_x[i], virtual_boundaries_pos_y[i]=virtual_boundaries_
   pos_y[i−1]+virtual_boundaries_diff_y[i].

where i=1, . . . num_virtual_boundaries−1

An exemplary syntax table incorporating the above embodiment to reduce the bit number is shown in Table 10.

TABLE 10

| | Descriptor |
|---|---|
| seq_parameter_set_rbsp( ) { | |
|    ... | |
|    sps_loop_filter_disabled_across_virtual_boundaries_flag | u(1) |
|    if( sps_loop_filter_disabled_across_virtual_boundaries_flag ) { | |
|       sps_num_ver_virtual_boundaries | ue(v) |
|       if( sps_num_ver_virtual_boundaries != 0 ) { | |
|          sps_virtual_boundaries_pos_x[ 0 ] | ue(v) |
|          for( i = 1; i < sps_num_ver_virtual_boundaries; i++ ) { | |
|             sps_virtual_boundaries_diff_x[ i ]   // difference | se(v) |
|          } | |
|       } | |
|       sps_num_hor_virtual_boundaries | ue(v) |
|       if( sps_num_hor_virtual_boundaries != 0 ) { | |
|          sps_virtual_boundaries_pos_y[ 0 ] | ue(v) |
|          for( i = 1; i < sps_num_hor_virtual_boundaries; i++ ) { | |
|             sps_virtual_boundaries_diff_y[ i ]   // difference | se(v) |
|          } | |
|       } | |
|    } | |
|    ... | |
| } | |

To reduce the bit number, the locations of the virtual boundaries can be set to multiple of minimum width/height of processing unit. Therefore, the locations of virtual boundaries can be signalled in the bitstream in units of minimum processing unit.

For example, the minimum processing unit in the emerging VVC (Versatile Video Coding) standard is 4×4 block; therefore, the location of the virtual boundaries is set to multiple of 4.

To further reduce the bit number, the locations of virtual boundaries could be signalled in the bitstream in units of slice, tile, CTU, CU, PU, TU, other predefined values or a combination thereof. For example, the location of a vertical virtual boundary can be 3-CTU width plus 5-block width.

This method can be combined with the syntax structure I, II and III to reduce the bit number of bitstream. This method can also be combined with other bit number reduction methods.

The bit number reduction method can also be applied to the offset and difference values in the syntax structures.

The virtual boundary position can be inherited from previous region (e.g. picture, slice, tile, CTU, CU, TU, PU, etc.) and, therefore, the number of bits can be reduced for the current region (e.g. picture, slice, tile, CTU, CU, TU, PU, etc.). For example, if the positions of virtual boundaries in the current frame are the same as previous frame, the virtual boundaries can be inherited from the previous frame. In another example, if the positions of virtual boundaries in the current CTU are the same as the previous CTU, the virtual boundaries can be inherited from the previous CTU. For the current region, one addition syntax (e.g. sps_virtual_boundary_inherit_flag) can be used to identify whether the virtual boundaries are inherited from a previous region or not.

An exemplary syntax table incorporating the above embodiment to reduce the bit number is shown in Table 11.

TABLE 11

| | Descriptor |
|---|---|
| seq_parameter_set_rbsp( ) { | |
|    ... | |
|    sps_loop_filter_disabled_across_virtual_boundaries_flag | u(1) |
|    if( sps_loop_filter_disabled_across_virtual_boundaries_flag ) { | |
|       sps_virtual_boundary_inherit_flag | u(1) |
|       if (! Sps_virtual_boundary_inherit) { | |
|          sps_num_ver_virtual_boundaries | ue(v) |
|          if( sps_num_ver_virtual_boundaries != 0 ) { | |
|             for( i = 0; i < sps_num_ver_virtual_boundaries; i++ ) { | |
|                sps_virtual_boundaries_pos_x[ i ] | ue(v) |
|             } | |
|          } | |
|          sps_num_hor_virtual_boundaries | ue(v) |
|          if( sps_num_hor_virtual_boundaries != 0 ) { | |

TABLE 11-continued

| | Descriptor |
|---|---|
| ``` for( i = 0; i < sps_num_hor_virtual_boundaries; i++ ) {     sps_virtual_boundaries_pos_y[ i ]       }     }   } } ...   } ``` | ue(v) |

Figure 9:
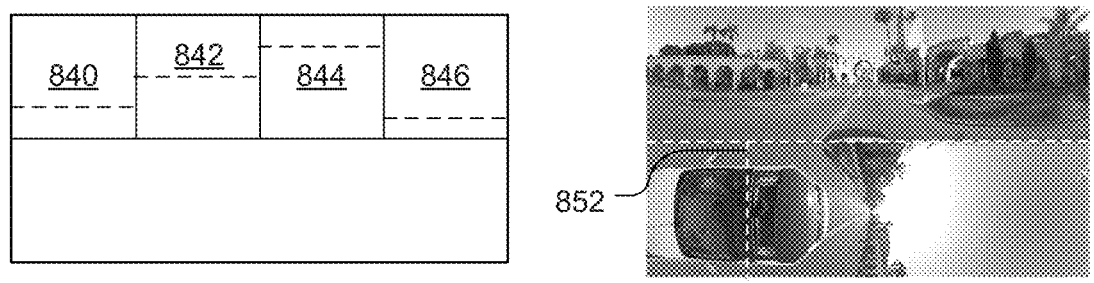
FIG. 9 illustrates an example of reference pixels extension for loop filtering process across a discontinuous edge or virtual boundary according to embodiments of the present invention.
Figure 9:
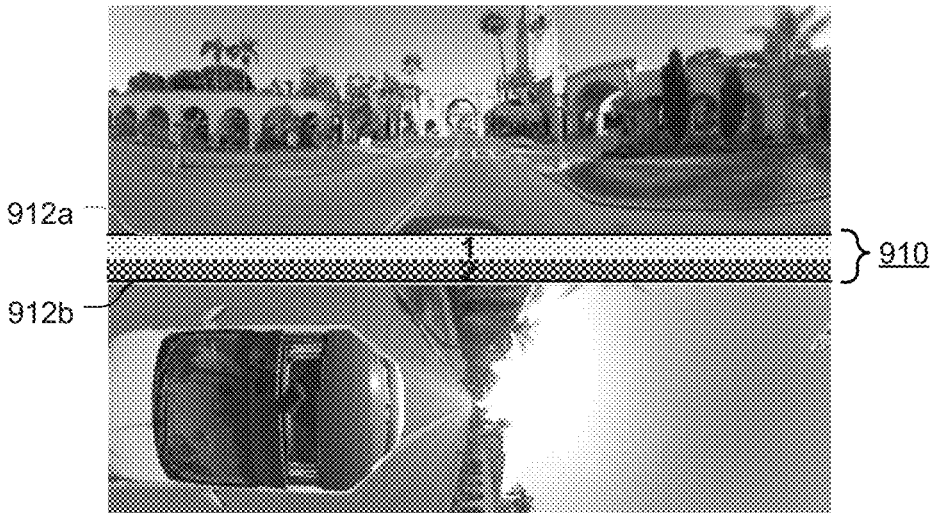

FIG. 9 illustrates an example of reference pixels extension 910 for loop filtering process across a discontinuous edge or virtual boundary according to embodiments of the present invention. In FIG. 9, pixels from the top sub-frame are extended to form alternative reference pixels (labelled as dot-filled area 1) and pixels from the bottom sub-frame are extended to form alternative reference pixels (labelled as dot-filled area 2). In FIG. 9, the virtual boundary (912a and 912b) are shown for the top sub-frame and the bottom sub-frame. When the pixels on the same side of the virtual boundary are extended to form the alternative reference pixels, the nearest pixels in the current sub-frame are used. In other words, the bottom line of the top sub-frame is extended downward to form the reference pixel area 1 and the top line of the bottom sub-frame is extended upward to form the reference pixel area 2. When a reference pixel from the other side of the discontinuous edge or virtual boundary is required for the loop filtering process, the nearest pixels in the current sub-frame (i.e., on the same side of discontinuous edge/virtual boundary as the current pixel) are used as the alternative referenced pixels. In FIG. 9, the VR360 picture consists of a top sub-frame and a bottom sub-frame. As is understood, the 3×2 cubemap layout is intended as an example to illustrate the reference pixel extension according to embodiment of the present invention.

The reference pixel extension can be applied to other VR360 layout formats, such as the layout formats derived from OctaHedron Projection (OHP), icosahedron projection (ISP), Segmented Sphere Projection (SSP) and Rotated Sphere Projection (RSP). There may be more than one virtual boundaries in the VR360 pictures. Furthermore, the virtual boundaries may be in other directions instead of vertical/horizontal. When the loop filtering process involves unexpected reference pixels (i.e., reference pixels on the other side of the virtual boundary), the nearest pixels on the same side as the current reconstructed pixel to be filtered can be extended to form the alternative reference pixels.

Figure 10:
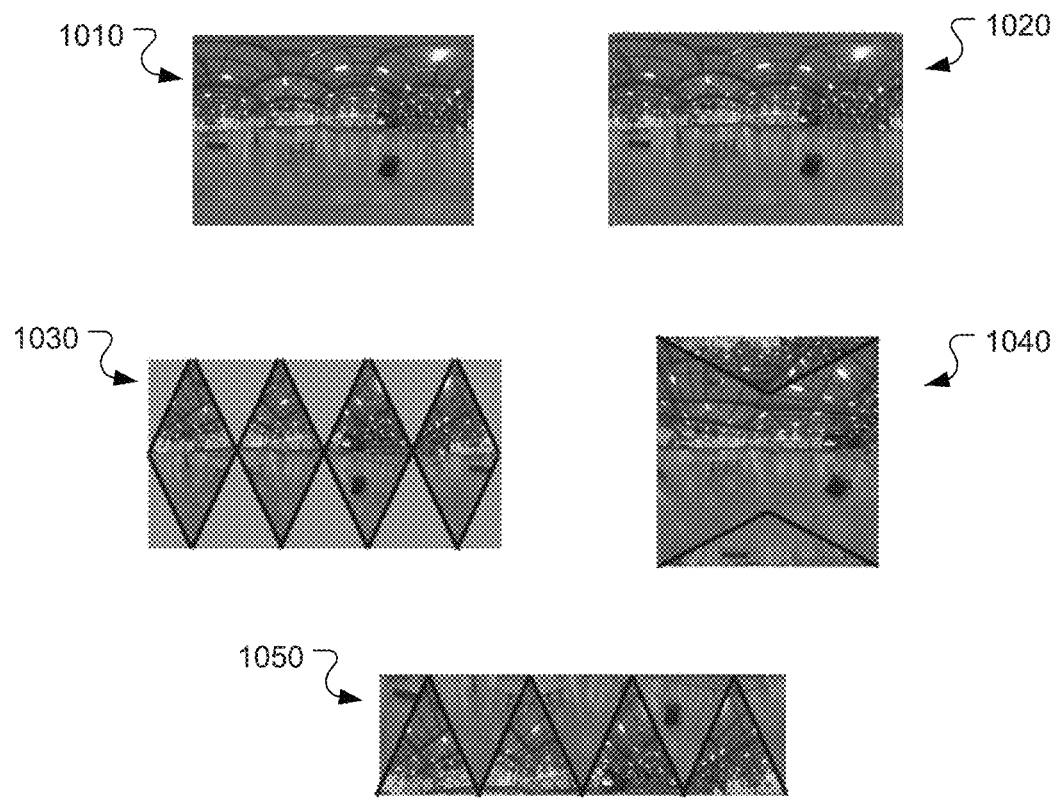
FIG. 10 illustrates various examples of VR360 projection including Equirectangular projection (ERP), Padded Equirectangular Projection (PERP), Octahedron Projection, Octahedron Projection in compact option 1, and Octahedron Projection in compact option 2 are shown in FIG. 10.
Figure 11:
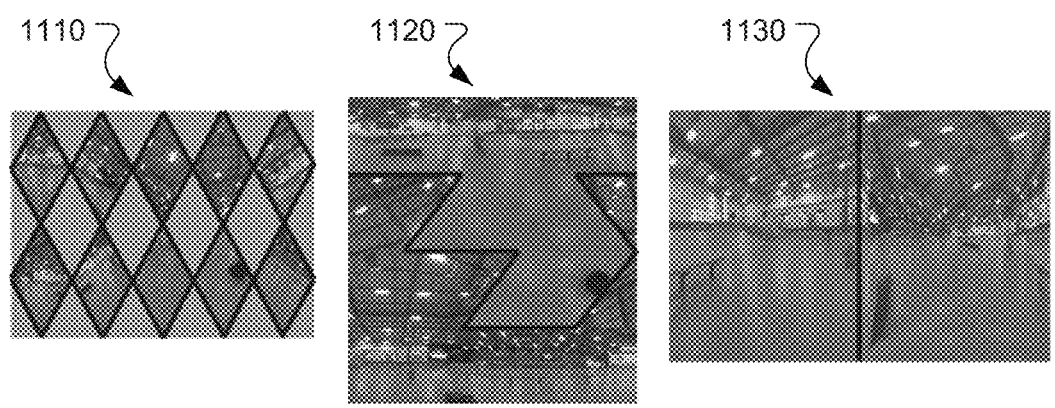
FIG. 11 illustrates various examples of VR360 projection including Icosahedron Projection, Icosahedron Projection in compact option 1, and Truncated Square Pyramid (TSP).
Figure 12:
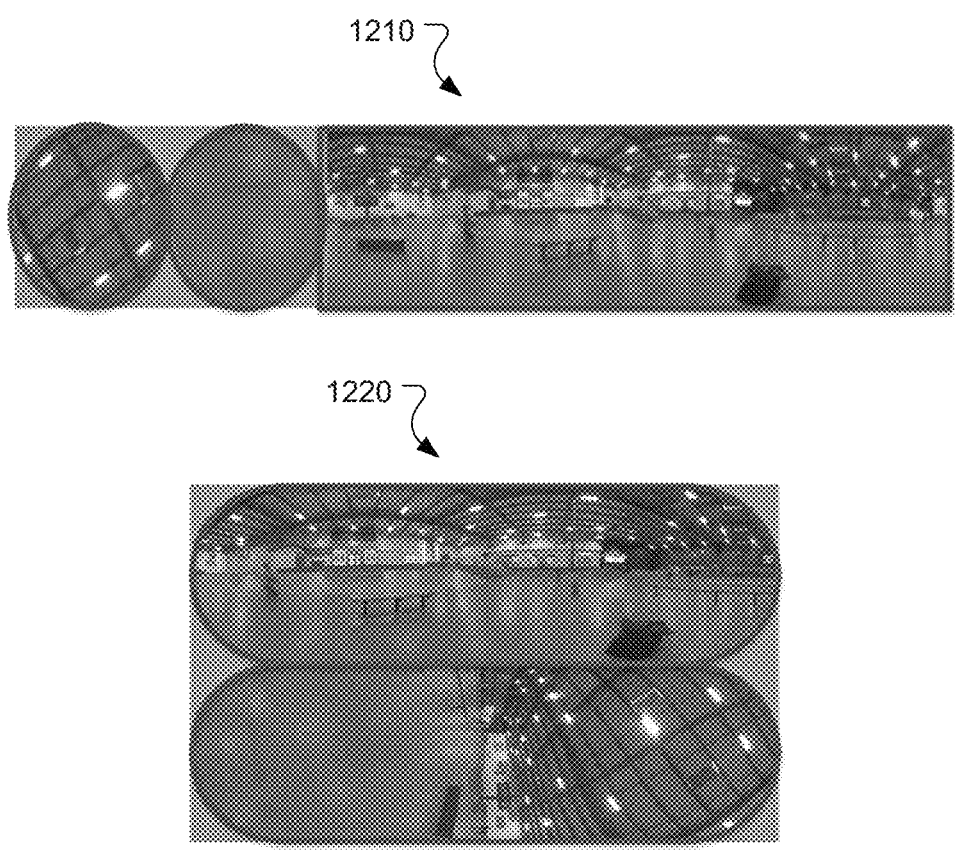
FIG. 12 illustrates various examples of VR360 projection including Segmented Sphere Projection (SSP) and Rotated Sphere Projection (RSP).

The filtering control (i.e., enable or disable) across virtual boundary has been shown based on the 3×2 cubemap layout. However, the filtering process across virtual boundaries described above is also applicable to other VR formats such as OctaHedron Projection (OHP), icosahedron projection (ISP), Segmented Sphere Projection (SSP) and Rotated Sphere Projection (RSP). Pictures corresponding to Equirectangular projection (ERP) 1010, Padded Equirectangular Projection (PERP) 1020, Octahedron Projection 1030, Octahedron Projection 1040 in compact option 1, and Octahedron Projection 1050 in compact option 2 are shown in FIG. 10. Pictures corresponding to Icosahedron Projection 1110, Icosahedron Projection 1120 in compact option 1, and Truncated Square Pyramid (TSP) 1130 are shown in FIG. 11. Pictures corresponding to Segmented Sphere Projection (SSP) 1210 and Rotated Sphere Projection (RSP) 1220 are shown in FIG. 12.

This method is not only applicable to the de-blocking filter, ALF and SAO filters but also applicable to the other filters.

Figure 13:
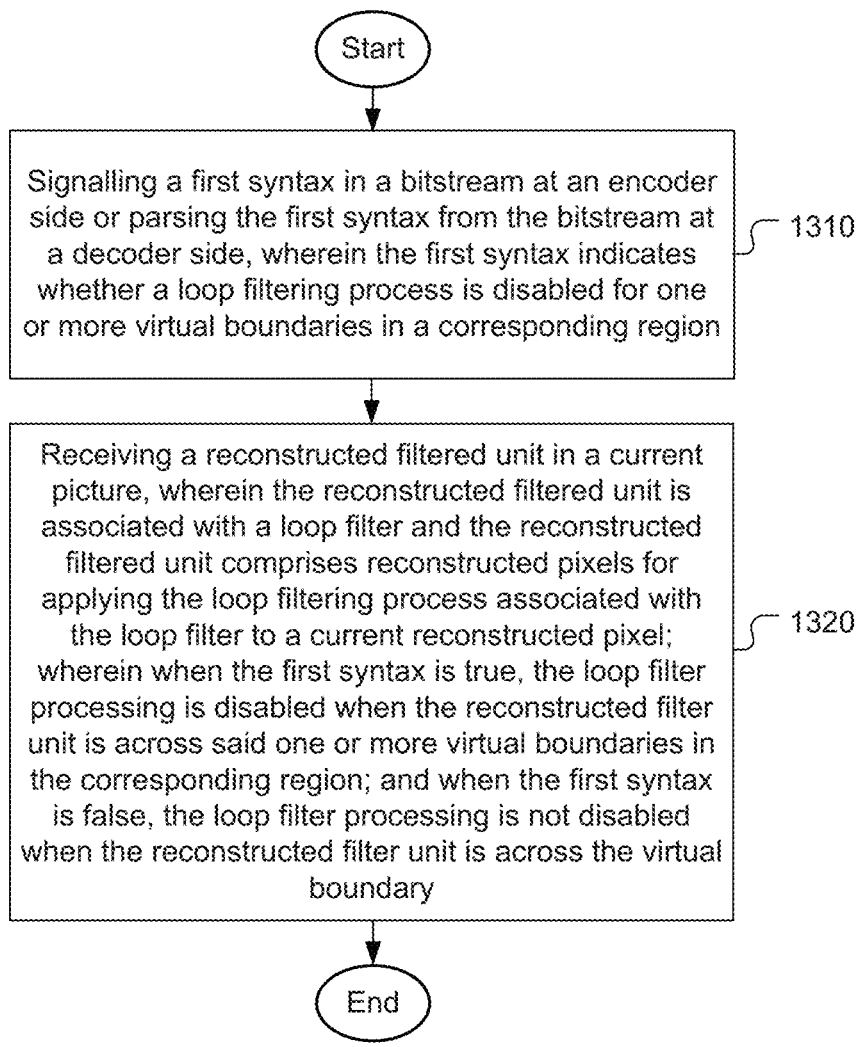
FIG. 13 illustrates an exemplary flowchart of a coding system for video according to an embodiment of the present invention, where a first syntax is signalled to indicate whether the loop filtering process is disabled for one or more virtual boundaries in a corresponding region.

FIG. 13 illustrates an exemplary flowchart of a coding system for video according to an embodiment of the present invention, where a first syntax is signalled to indicate whether the loop filtering process is disabled for one or more virtual boundaries in a corresponding region. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a first syntax is signalled in a bitstream at an encoder side or the first syntax is parsed from the bitstream at a decoder side in step 1310, wherein the first syntax indicates whether a loop filtering process is disabled for one or more virtual boundaries in a corresponding region. A reconstructed filter unit for a current reconstructed pixel in a picture is received in step 1320, wherein the reconstructed filter unit is associated with a loop filter and the reconstructed filter unit comprises reconstructed pixels for applying a loop filtering process associated with the loop filter to the current reconstructed pixel. When the first syntax is true, the loop filter processing is disabled when the reconstructed filter unit is across said one or more virtual boundaries in the corresponding region. When the first syntax is false, the loop filter processing is not disabled when the reconstructed filter unit is across the virtual boundary.

The flowchart shown above is intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a video sequence, wherein pictures from the video sequence include one or more discontinuous edges, the method comprising:

signalling a first syntax in a bitstream at an encoder side or parsing the first syntax from the bitstream at a decoder side, wherein the first syntax indicates whether a loop filtering process is disabled for one or more virtual boundaries in a corresponding region;

receiving a reconstructed filter unit in a current picture, wherein the reconstructed filter unit is associated with a loop filter and the reconstructed filter unit comprises reconstructed pixels for applying the loop filtering process associated with the loop filter to a current reconstructed pixel;

wherein when the first syntax is true:

the loop filter processing is disabled when the reconstructed filter unit is across said one or more virtual boundaries in the corresponding region; and one or more second syntaxes are signalled at the encoder side or parsed at the decoder side, and wherein said one or more second syntaxes comprise a first number to indicate a number of vertical virtual boundaries and a second number to indicate a number of horizontal virtual boundaries in the corresponding region, said one or more second syntaxes further indicate locations of said one or more virtual boundaries, and wherein the locations of said one or more virtual boundaries are measured in terms of width and/or height of processing unit; and when the first syntax is false, the loop filter processing is not disabled when the reconstructed filter unit is across the virtual boundary in the corresponding region.

2. The method of claim 1, wherein the first syntax is signalled in or parsed from the bitstream at a syntax level comprising SPS (Sequence Parameter Set), PPS (Picture Parameter Set), APS (Application Parameter Set), slice, tile, picture, CTU (Coding Tree Unit), CU (Coding Unit), PU (Prediction Unit) or TU (Transform Unit) level for the corresponding region.

3. The method of claim 1, wherein each vertical virtual boundary is from a top edge to a bottom edge of the corresponding region and each horizontal virtual boundary is from a left edge to a right edge of the corresponding region; when the first number is greater than 0, locations of each vertical virtual boundary are transmitted in or parsed from the bitstream; and when the second number is greater than 0, locations of each horizontal virtual boundary are transmitted in or parsed from the bitstream.

4. The method of claim 1, wherein the vertical virtual boundaries are not necessarily from a top edge to a bottom edge of the corresponding region and the horizontal virtual boundaries are not necessarily from a left edge to a right edge of the corresponding region; when the first number is greater than 0, locations of x-position, y starting position and y ending position for each vertical virtual boundary are transmitted in or parsed from the bitstream; and when the second number is greater than 0, locations of y-position, x starting position and x ending position for each horizontal virtual boundary are transmitted in or parsed from the bitstream.

5. The method of claim 1, wherein length of the vertical virtual boundaries and the length of the horizontal virtual boundaries is fixed; when the first number is greater than 0, location of starting point for each vertical virtual boundary is transmitted in or parsed from the bitstream; and when the second number is greater than 0, the location of starting point for each horizontal virtual boundary is transmitted in or parsed from the bitstream.

6. The method of claim 1, wherein if the first syntax is true, one or more second syntaxes are signalled at the encoder side or parsed at the decoder side, and wherein said one or more second syntaxes indicate a number of said one or more virtual boundaries in the corresponding region.

7. The method of claim 6, wherein when the number of said one or more virtual boundaries is greater than 0, locations of starting points and ending points of said one or more virtual boundaries are transmitted in the bitstream.

8. The method of claim 7, wherein said one or more virtual boundaries correspond to one or more rectangle boxes and starting points and ending points correspond to left-top positions and right-bottom positions of said one or more rectangle boxes.

9. The method of claim 6, wherein when the number of said one or more virtual boundaries is greater than 0, locations of starting points and offset values between the starting points and corresponding ending points of said one or more virtual boundaries are transmitted in or parsed from the bitstream.

10. The method of claim 1, wherein one or more second syntaxes are signalled at the encoder side or parsed at the decoder side to indicate difference values between a current virtual boundary and a previous virtual boundary.

11. The method of claim 10, wherein when the current virtual boundary is a first virtual boundary in the corresponding region, absolute position of the first virtual boundary is signalled directly at the encoder side or parsed directly at the decoder side.

12. The method of claim 10, wherein when the current virtual boundary is a first virtual boundary in the corresponding region, difference between the first virtual boundary and a starting point of the corresponding region is signalled directly at the encoder side or parsed at the decoder side.

13. The method of claim 1, wherein a processing unit is set to a region comprising a picture, a slice, a tile, a CTU (coding tree unit), a CU (coding unit), a PU (prediction unit), a TU (transform unit), or a pre-defined value.

14. The method of claim 1, wherein if a target corresponding region have same virtual boundaries as a previous corresponding region, the target corresponding region inherits the same virtual boundaries as the previous corresponding region.

15. The method of claim 14, wherein the target corresponding region comprises a picture, a slice, a tile, a CTU (coding tree unit), a CU (coding unit), a PU (prediction unit), a TU (transform unit).

16. The method of claim 14, wherein a second syntax is signalled at the encoder side or parsed at the decoder side to indicate whether the target corresponding region inherits the same virtual boundaries as the previous corresponding region.

17. The method of claim 1, wherein the loop filter belongs to a group comprising de-blocking filter, SAO (Sample Adaptive Offset) filter and ALF (Adaptive Loop Filter).

18. An apparatus for coding a video sequence, wherein pictures from the video sequence include one or more discontinuous edges, the apparatus comprising one or more electronic devices or processors configured to:
    signal a first syntax in a bitstream at an encoder side or parsing the first syntax from the bitstream at a decoder side, wherein the first syntax indicates whether a loop filtering process is disabled for one or more virtual boundaries in a corresponding region;
    receive a reconstructed filter unit in a current picture, wherein the reconstructed filter unit is associated with a loop filter and the reconstructed filter unit comprises reconstructed pixels for applying the loop filtering process associated with the loop filter to a current reconstructed pixel;
wherein when the first syntax is true:
the loop filter processing is disabled when the reconstructed filter unit is across said one or more virtual boundaries in the corresponding region; and
one or more second syntaxes are signalled at the encoder side or parsed at the decoder side, and wherein said one or more second syntaxes comprise a first number to indicate a number of vertical virtual boundaries and a second number to indicate a number of horizontal virtual boundaries in the corresponding region, said one or more second syntaxes further indicate locations of said one or more virtual boundaries, and wherein the locations of said one or more virtual boundaries are measured in terms of width and/or height of processing unit; and
when the first syntax is false, the loop filter processing is not disabled when the reconstructed filter unit is across the virtual boundary in the corresponding region.

* * * * *